(12) United States Patent
Garg et al.

(10) Patent No.: US 10,762,440 B1
(45) Date of Patent: Sep. 1, 2020

(54) SENSOR FUSION AND DEEP LEARNING

(71) Applicant: Apple Inc., Cupertino, CA (US)

(72) Inventors: Kshitiz Garg, Santa Clara, CA (US);
Ahmad Al-Dahle, San Jose, CA (US)

(73) Assignee: Apple Inc., Cupertino, CA (US)

( * ) Notice: Subject to any disclaimer, the term of this patent is extended or adjusted under 35 U.S.C. 154(b) by 643 days.

(21) Appl. No.: 15/275,199

(22) Filed: Sep. 23, 2016

Related U.S. Application Data (60) Provisional application No. 62/232,353, filed on Sep. 24, 2015.

(51) Int. Cl.
*G06N 20/00* (2019.01)
*G06F 11/34* (2006.01)
*G06F 11/30* (2006.01)

(52) U.S. Cl.
CPC ......... *G06N 20/00* (2019.01); *G06F 11/3024* (2013.01); *G06F 11/3447* (2013.01)

(58) Field of Classification Search
CPC .................................................. G06K 9/6288
See application file for complete search history.

(56) References Cited

U.S. PATENT DOCUMENTS

| | | | |
|---|---|---|---|
| 6,445,983 B1 | 9/2002 | Dickson et al. | |
| 6,889,171 B2 * | 5/2005 | Skrbina | G01S 13/931 701/301 |
| 7,283,904 B2 | 10/2007 | Benjamin et al. | |
| 9,183,459 B1 * | 11/2015 | Zhang | G06K 9/52 |
| 9,224,053 B1 * | 12/2015 | Ferguson | G06K 9/00798 |
| 9,342,759 B1 * | 5/2016 | Chen | G06K 9/6262 |
| 9,664,510 B2 * | 5/2017 | Nathan | G06Q 10/08 |
| 2003/0078754 A1 | 4/2003 | Hamza | |
| 2006/0080328 A1 | 4/2006 | Anderson | |
| 2006/0120609 A1 * | 6/2006 | Ivanov | G06K 9/00711 382/224 |
| 2008/0195304 A1 | 8/2008 | Krishnaswamy | |
| 2009/0322871 A1 * | 12/2009 | Ji | G01S 7/412 348/115 |

(Continued)

OTHER PUBLICATIONS

U.S. Appl. No. 15/709,404, filed Sep. 19, 2017, Xinyu Xu.

*Primary Examiner* — Li Wu Chang
(74) *Attorney, Agent, or Firm* — Robert C. Kowert; Kowert, Hood, Munyon, Rankin & Goetzel, P.C.

(57) ABSTRACT

Some embodiments provide a sensor data-processing system which detects and classifies objects detected in an environment via fusion of sensor data representations generated by multiple separate sensors. The sensor data-processing system can fuse sensor data representations generated by multiple sensor devices into a fused sensor data representation and can further detect and classify features in the fused sensor data representation. Feature detection can be implemented based at least in part upon utilizing a feature-detection model generated via one or more of deep learning and traditional machine learning. The sensor data-processing system can adjust sensor data processing of representations generated by sensor devices based on external factors including indications of sensor health and environmental conditions. The sensor data-processing system can be implemented in a vehicle and provide output data associated with the detected objects to a navigation system which navigates the vehicle according to the output data.

20 Claims, 6 Drawing Sheets

(56) References Cited

U.S. PATENT DOCUMENTS

| | | | |
|---|---|---|---|
| 2014/0035775 A1* | 2/2014 | Zeng | G01S 13/867 |
| | | | 342/52 |
| 2014/0067748 A1* | 3/2014 | Dubberley | G06N 7/005 |
| | | | 706/52 |
| 2015/0363706 A1* | 12/2015 | Huber | G06F 16/955 |
| | | | 707/603 |
| 2016/0180197 A1* | 6/2016 | Kim | G01S 5/16 |
| | | | 382/103 |
| 2017/0242117 A1* | 8/2017 | Izzat | G01S 13/867 |
| 2017/0364090 A1* | 12/2017 | Grufman | G05D 1/0214 |
| 2017/0371329 A1 | 12/2017 | Giering et al. | |
| 2018/0067488 A1* | 3/2018 | Pollach | G06N 20/00 |
| 2018/0165828 A1 | 6/2018 | Sasatani et al. | |

\* cited by examiner

SENSOR FUSION AND DEEP LEARNING

This application claims benefit of priority of U.S. Provisional Application Ser. No. 62/232,353, filed Sep. 24, 2015, which is hereby incorporated by reference herein in its entirety.

BACKGROUND

In many situations, objects in an environment can be detected at a sensor-data processing system which processes sensor data representations of the environment which are generated by one or more sets of sensor devices coupled to the computer system.

In some cases, the sensor data processing system can be included in a vehicle, where the vehicle can be autonomously navigated through an environment based on sensor data representations of the environment which are generated by one or more sets of sensor devices included in the vehicle. Based on the sensor data representations, a control system included in the vehicle can navigate the vehicle along one or more various driving routes which avoid intersection with various dynamic elements, static elements, etc. located in the environment.

In some cases, utilizing sensor data representations of an environment to navigate a vehicle includes processing the sensor data representations to detect, in the representations, objects located in the environment. For example, where a sensor data representation of an environment includes a captured image of at least a portion of the environment, the processing can include detecting an object in the captured image. However, in some cases, accurately detecting objects in an environment based on sensor data representation processing can be insufficiently responsive and excessively expensive for ideal use.

In some cases, one or more sensor devices included in a vehicle can be affected by ambient environmental conditions, including precipitation, device faults, etc. As a result, sensor data representations generated by the sensor device can be at least partially degraded, which can adversely affect navigation of the vehicle along trajectories which avoid intersection with various elements located in the environment.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Some embodiments include a sensor data-processing system which can fuse sensor data representations, also referred to interchangeably herein as raw sensor data, etc. generated by various sensor devices prior to classification of environmental features included in the representations as being associated with one or more various particular elements located in the environment.

Figure 1:
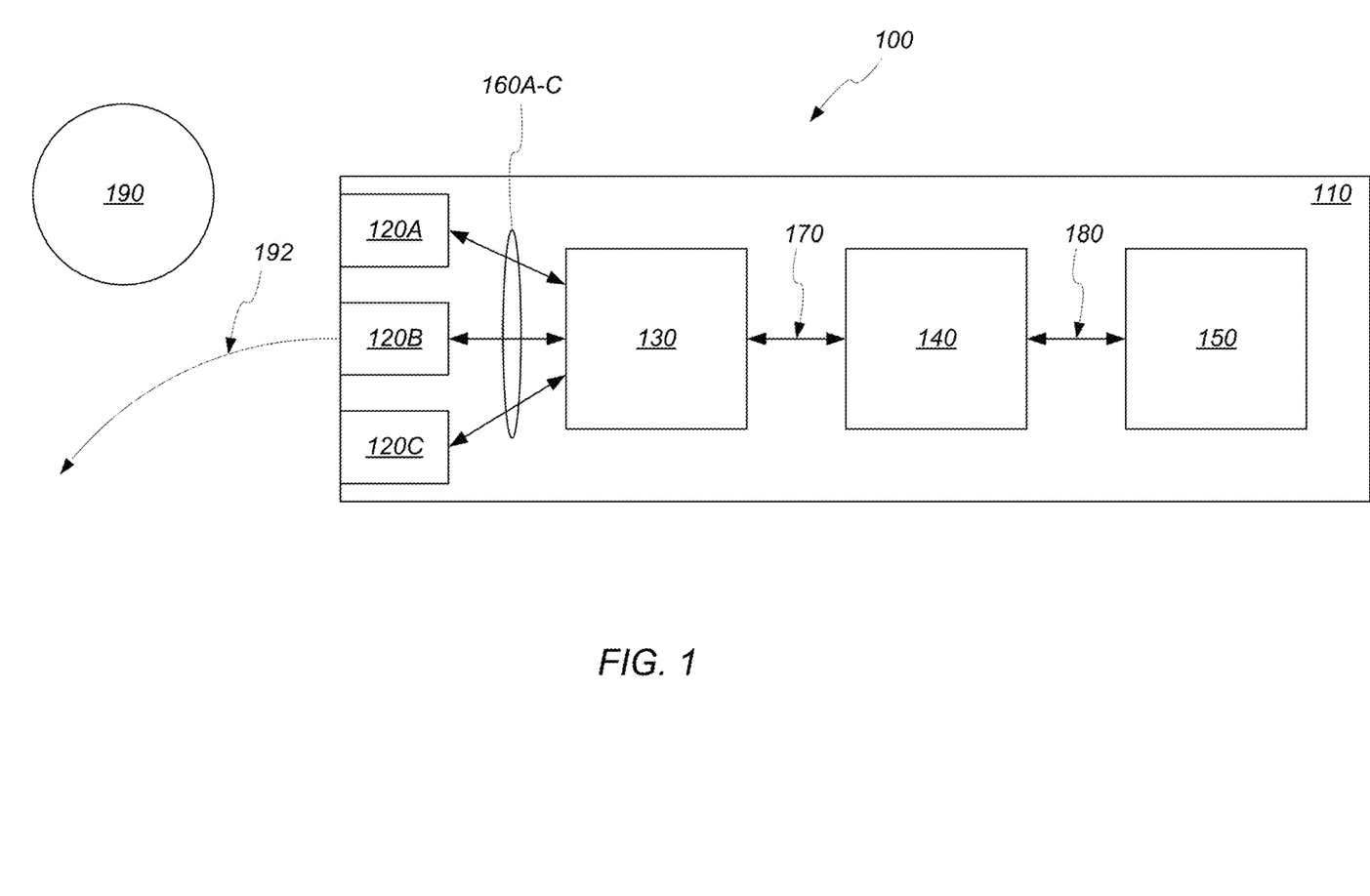
FIG. 1 illustrates a vehicle, according to some embodiments.

FIG. 1 illustrates a vehicle, according to some embodiments. The vehicle 110 is located in an external environment 100 and can include an autonomous navigation system 140 which can autonomously control one or more vehicle control elements 150 to cause the vehicle to be navigated along one or more driving routes 192 through the environment 100 based on various objects 190 detected and classified in the environment 100.

Vehicle 110 includes a set of sensor devices 120A-C in the vehicle which are configured to monitor one or more portions of the environment 100. It will be understood that, although three sensor devices 120A-C are illustrated in FIG. 1, the vehicle 110 can, in some embodiments, include any number of sensor devices. Each sensor device 120A-C can include one or more of a camera device, infrared camera device, near-infrared camera device, ultrasonic sensor device, light beam scanning device, LIDAR device, stereo sensor device, kinematic sensor device, geo-positioning sensor device, some combination thereof, etc. Each sensor device generates, as raw data, sensor data representations of one or more portions of the environment 100 which the respective device is monitoring.

Sensor devices 120A-C can be communicatively coupled, via one or more communication links 160A-C, to a sensor data-processing system 130 which can be implemented by one or more computer systems and implements one or more sensor data classifier models via which the sensor data representations are processed to detect and classify features in the representations as being representations of one or more particular objects 190 in the environment 100. System 130, in some embodiments, implements one or more Deep Neural Network (DNN) algorithms to at least partially process sensor data representations generated by one or more sensors 120.

Vehicle 110 includes an autonomous navigation system 140 which is communicatively coupled to the sensor data-processing system 130 via a communication link 170. The autonomous navigation system 140 can be implemented by one or more computer systems and is configured to develop a driving route 192 through the environment 100 based on the detection and classification of features in the environment 100. The autonomous navigation system 140 further generates control command signals which are transmitted, via one or more communication links 180, to one or more vehicle control elements 150 and which, when executed by the one or more vehicle control elements 150, cause the vehicle 110 to be navigated along the driving route 192. As shown, the driving route 192 can navigate the vehicle 110 in avoidance of the object 190 in the environment 100. The autonomous navigation system 140 can be configured to generate a driving route 192 which navigates the vehicle 110 to avoid objects 190 in the environment 100, based on a detection of the object 190 at the sensor data-processing system 130. A vehicle control element can include one or more of a throttle control device, a steering control device, a braking control device, etc.

Figure 2:
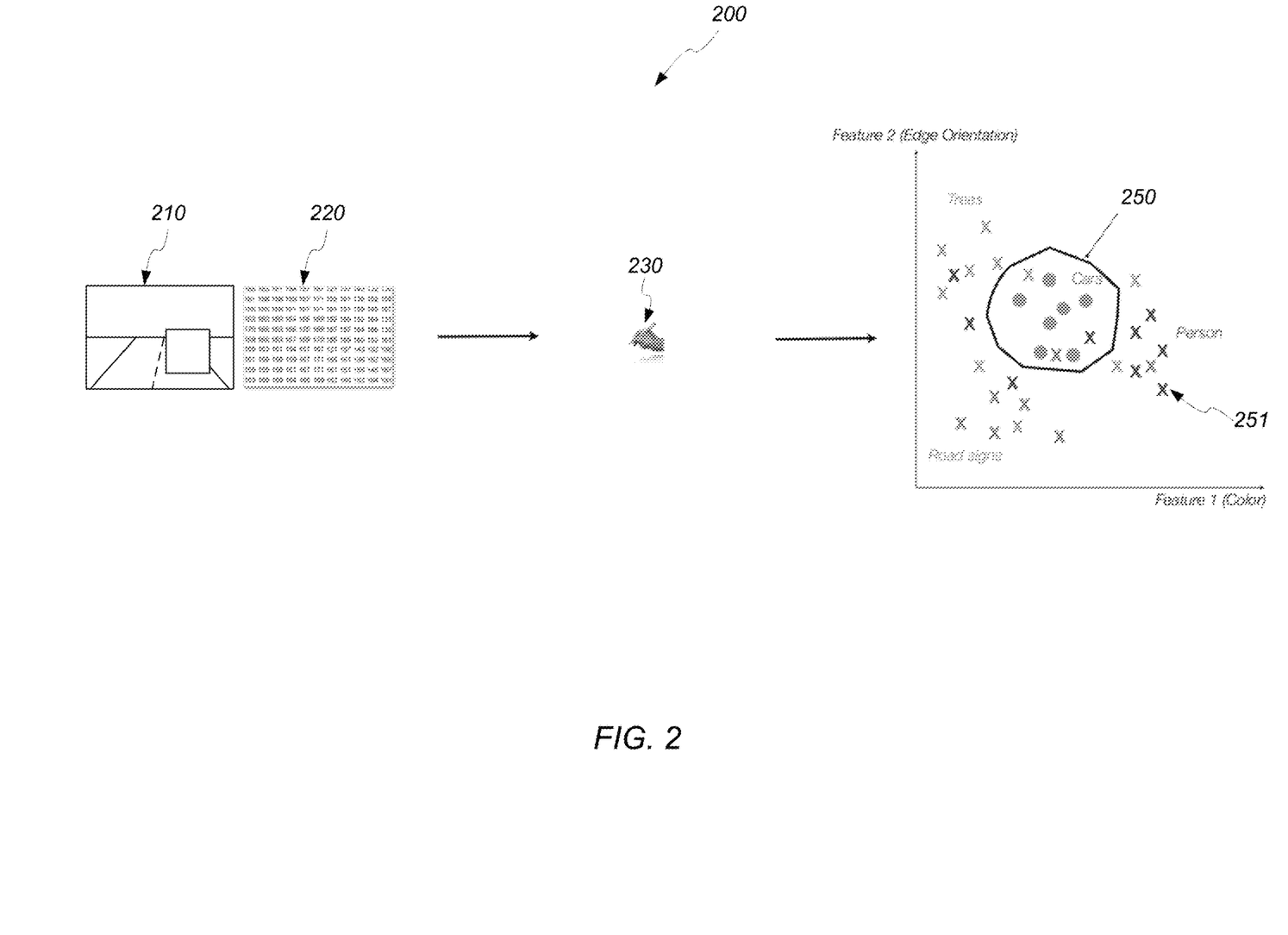
FIG. 2 illustrates training a sensor data-processing system to detect and classify objects based, on detected features in sensor data representations of an environment, via traditional machine learning, according to some embodiments.

FIG. 2 illustrates training a sensor data-processing system to detect and classify objects based, on detected features in sensor data representations of an environment, via traditional machine learning, according to some embodiments. The training can be implemented with regard to any embodiment of sensor data-processing system included herein.

In some embodiments, configuring a sensor data-processing system to accurately detect and classify objects in an environment, based on processing sensor data representations of the environment generated by one or more sensor devices, includes the system being "trained" to detect and classify various particular features, in the sensor data representations, which are associated with the various objects. In some embodiments, training a sensor data-processing system via traditional machine learning includes configuring the system to detect and classify features based on predetermined features which can be included in sensor data representations. Such features can be manually (i.e., by a human being) determined based on manual analysis of sensor data representations, manual identification of features in the representations, manual classification of the features as being associated with one or more particular class labels, etc. The sensor data-processing system which implements traditional machine learning can classify sensor data representation features via comparison of sensor data representations with the manually-determined sensor data features and can detect and classify features in a sensor data representation based on comparison with the manually-determined features.

The traditional machine learning training process 200 illustrated in FIG. 2 includes a sensor data representation 220 of a portion 210 of an environment. Based on manual analysis and processing 230 of the representation 220 of the environment portion 210, a particular set 250 of features 251 included in the representation 220 can be manually identified as corresponding to a particular environment object associated with a particular class label. As a result, a sensor data-processing system which utilizes the illustrated traditional machine learning to detect and classify objects in an environment can utilize the manually-identified features 250 to detect and classify similar features included in a sensor data representation 220 as features corresponding to the environment object based on determining a correlation between the features with the manually-identified set 250 of features.

Because the features are manually determined, rather than being autonomously developed based on sensor data, the features which can be classified in the sensor data representations can be restricted to the particular features developed based on manual input.

Figure 3:
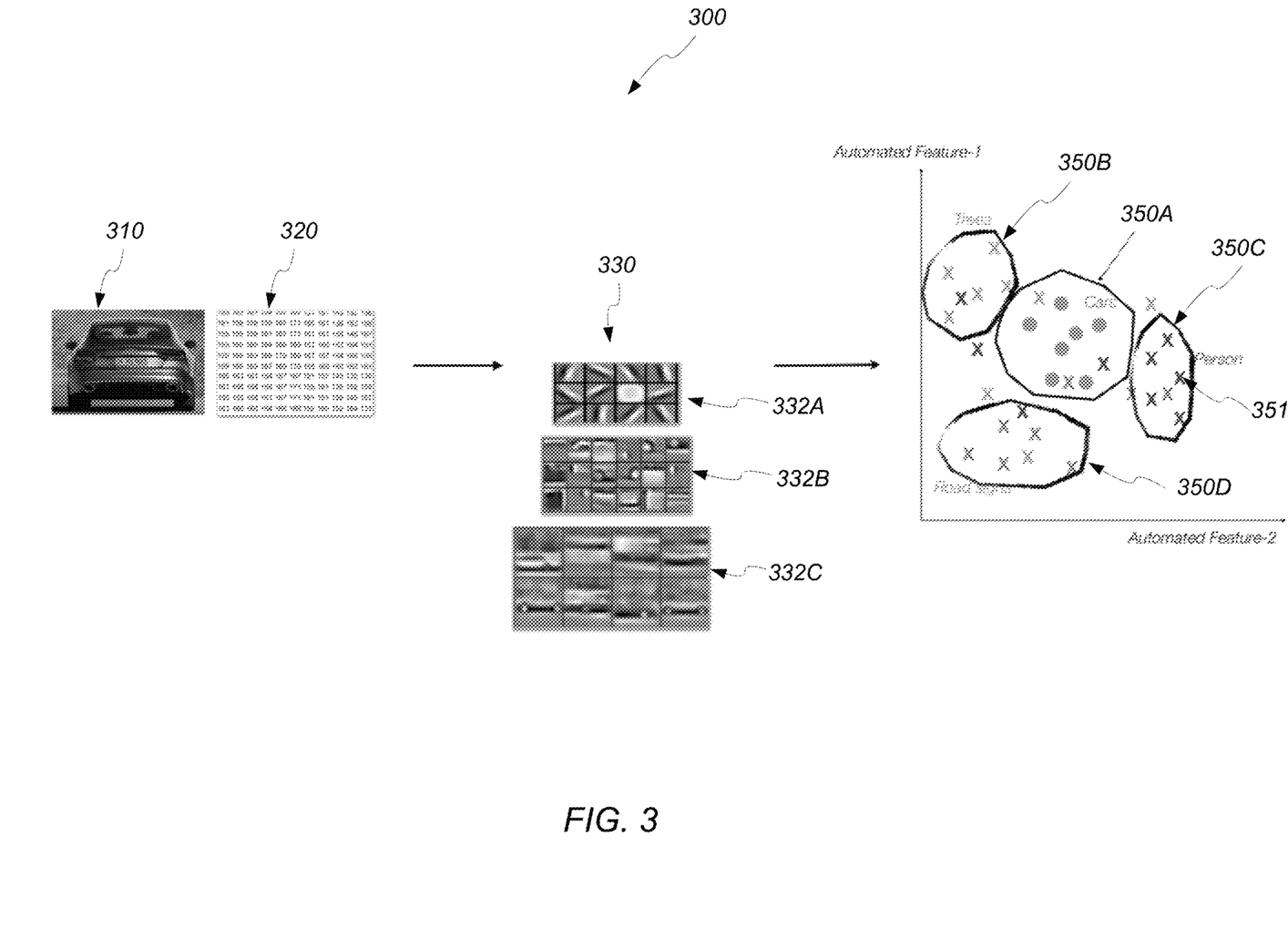
FIG. 3 illustrates training a sensor data-processing system to detect and classify objects based, on detected features in sensor data representations of an environment, via deep learning, according to some embodiments.

FIG. 3 illustrates training a sensor data-processing system to detect and classify objects based on detected features in sensor data representations of an environment, via deep learning, according to some embodiments. The training can be implemented with regard to any embodiment of sensor data-processing system included herein.

Some embodiments include a sensor data-processing system which processes sensor data representations generated by various sensor devices via one or more deep-learning system which classify features included in the representations via utilization of deep learning algorithms.

Deep learning comprises a branch of machine learning based on a set of algorithms that attempt to model high-level abstractions in data by using model architectures, with complex structures or otherwise, composed of multiple non-linear transformations.

Deep learning is part of a family of machine learning methods based on learning features of environment objects in an environment based on processing sensor data representations of a portion of the environment. An observation of a portion of an environment (e.g., an image of the environment portion) can be represented in many ways, including as a vector of intensity values per pixel, in a more abstract way as a set of edges, regions of particular shape, etc. Some representations by one or more sensors are also referred to herein as sensor data representations and facilitate learning, by one or more machines implementing one or more machine learning methods, of one or more tasks (e.g., face recognition or facial expression recognition) from examples. In some embodiments, implementing deep learning enables autonomous learning of particular features in sensor data representations via which various elements in the environment (also referred to as environment objects)

can be detected and classified. Learning a feature can include the system autonomously identifying and classifying one or more features, in one or more sensor data representations of an environment, which correspond to one or more particular environmental elements in the environment. Autonomous learning of features can negate utilization of manually-developed features, as the features can be autonomously extracted, learned, etc. based on processing sensor data representations via deep learning.

Deep learning autonomously determines features to detect and classify as corresponding to particular environment objects from raw sensor data input, also referred to as sensor data representations, and these features can be hierarchical, including multiple layers of features. Each layer of features can be based on previous layers of less-complex features so that higher-tier features are more complicated than lower-tier features upon which the higher-tier features are based.

As a result, deep learning methods where features are learnt autonomously, rather than receiving manually-determined features, results in a sensor-processing method which provides better overall feature classification performance than traditional machine learning methods where features are generally manually pre-determined. Deep learning based methods can require more data than traditional machine learning methods but also can utilize more data input, can handle multiple classes of environment objects, etc.

A sensor data-processing system which includes one or more sensor feature classifier layers which utilize deep learning algorithms can be referred to herein as utilizing one or more deep neural networks (DNN).

Training of such a system, which includes developing the various features via which the system detects and classifies features in sensor data representations, can be implemented as an iterative process. Such a process can include building a deep learning model architecture, training a deep learning algorithm, also referred to herein as a model architecture, to autonomously determine features, and testing the model architecture applying the determined features to accurately detect and classify features in sensor data representations. The process can be iterative, where various elements of the model architecture can be adjusted with successive iterations, until one or more of accuracy and precision of the detection and classification of features is achieved.

The deep learning training process 300 illustrated in FIG. 3 includes a sensor data representation 320 of a portion 310 of an environment. A deep learning algorithm 330 processes the representation 320 and develops a hierarchy of features 332A-C based on the processing. The hierarchy can include a low tier 332A of simple features, an intermediate tier 332B of more complex features which are based on sets of the low-tier features 332A, and a high tier 332C of more complex features which are based on sets of the lower-tier features 332B. The algorithm 330 can autonomously identify the features 332A-C. As further shown, the hierarchy of features 332A-C can be classified into various sets 350A-D of features 351 which are each associated with various sets of particular class labels. The process 300 can be iterative. As an output of the training process, a sensor data-processing system can utilize the hierarchy of features 332A-C and associated class labels to detect and classify the features in various sensor data representations of various environments.

Once an algorithm is trained, it is installed into a sensor data-processing system located in a vehicle. A sensor data-processing system which implements a deep learning algorithm can require less time and power to process sensor data, relative to traditional sensor data-processing systems. In some embodiments, a sensor data-processing system implementing a deep learning algorithm implements general computing hardware configurations, including one or more of general CPU and GPU configurations. In some embodiments, a sensor data-processing system implementing a deep learning algorithm implements one or more particular computing hardware configurations, including one or more of Field-programmable gate array (FPGA) processing circuitry, neuromorphic processing circuitry, etc. Particular computing hardware configurations can provide augmented computing performance with reduced power consumption, relative to conventional hardware configurations, which can be beneficial when a sensor data-processing system implements one or more deep learning algorithms, which can be relatively computationally expensive relative to traditional data-processing algorithms.

DNN algorithms can be utilized by a sensor data-processing system included in a vehicle which is configured to be autonomously navigated, where the DNN algorithms are utilized for "perception". Perception refers to the sensor data-processing system processing sensor data representations of an environment which are generated by sensor devices in the vehicle to generate output information which characterizes the various elements located in the environment. For example, a perception output from a sensor data-processing system located in a vehicle navigating along a road can include information indicating that there are 3 cars and 2 people on the road, the distances, velocity and trajectories of the objects, etc. The output information can be utilized by one or more autonomous navigation systems in the vehicle to determine how to navigate the vehicle based on the information, including determining a speed, trajectory, etc. of the vehicle.

Figure 4:
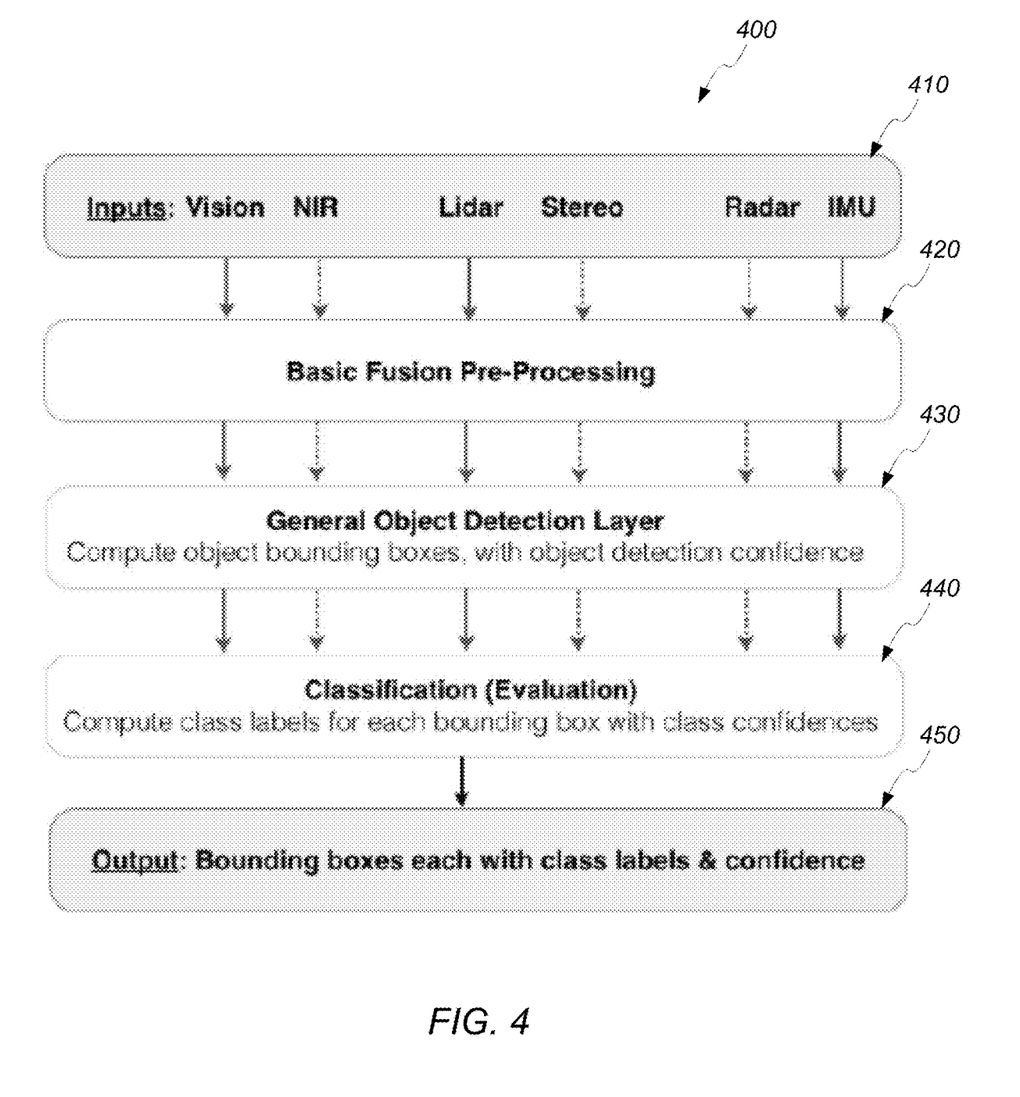
FIG. 4 illustrates an evaluation system which tests classification and detection models, according to some embodiments.

FIG. 4 illustrates an evaluation system which tests classification and detection models, according to some embodiments. The system 400 can be included in any of the embodiments included herein. The evaluation system can be included in any embodiments of the sensor data-processing system included herein.

In some embodiments, the evaluation system 400 can test one or more classification and detection models implemented by a sensor data-processing system. Input can include sensor data representations in one or more various sensor modalities. In some embodiments, the system operates in a fail-safe manner in presence of limited sensor modalities.

FIG. 4 illustrates the inputs 410 provided to the system 400 and the expected output 450. As shown, the inputs can include one or more sets of sensor data representations, of one or more portions of an environment, which are generated by one or more sets of sensor devices. As shown, the sensor devices can include on or more visible light sensors, near infrared sensors, LIDAR sensors, stereo sensors, radar devices, IMU sensors, etc. The final output 450 from the system 400 can include bounding boxes with associated class labels and confidence values. A bounding box can include a representation, in a world model of an external environment, of an object located in the environment, where the associated class label indicates a class of the environment object and the confidence value indicates a confidence level associated with the determination that the environment object associated with the class label is located within the portion of the environment located within the bounding box. A class of environment object can include, for example, a vehicle, pedestrian, animal, etc.

Inputs 410 provided to the system 400 include sensor data representations of an environment generated by the one or more sensor devices. The inputs are received into a basic fusion pre-processing layer 420 which is configured to fuse sensor data representations generated by various sensor devices into a combined sensor data representation of the environment. The fusion can be implemented, by layer 420, based at least in part upon computing one or more sensor data features based on preprocessing a fused sensor data representation.

The evaluation system 400 can comprise a general object detection layer 430 which identifies, within a sensor data representation provided by layer 420, one or more regions of interest. The one or more regions of interest in the provided representation can be referred to as an object bounding box. The general object detection layer can be configured to have a relatively high recall rate. The evaluation system 400 can comprise a classification layer 440 which is configured to classify regions of interest in a sensor data representation into one or more classes of environmental objects and reject false positive identifications of environmental objects.

For a given sensor data representation provided as an input into system 400, the output 450 of the classification layer 440, also referred to herein as a classifier, can include a list of bounding boxes specifying the coordinates of the box within a world model of the environment and all the class labels including the confidence measure for each class.

For example, if there are 3 classes of objects $c_1$, $c_2$, $c_3$ and a neg class which can be associated with other objects, then the final output 450 can include a file which comprise a list of bounding boxes, and confidence scores $s_1$, $s_2$, $s_3$ and s_neg for each class label to give ($x_1$, $x_2$, $y_1$, $y_2$, $c_1$, $s_1$, $c_2$, $s_2$, $c_3$, $s_3$, neg, s_neg).

For a given portion of an environment represented by a sensor data representation, the output for the general object detection layer 430 can include a list of boxes, specified as ($x_1$, $x_2$, $y_1$, $y_2$, s), where "s" is the confidence level score. For the classification layer 440, for a given bounded box, the output can include a list of confidence values for each class ($c_1$, $s_1$, $c_2$, $s_2$, $c_3$, $s_3$, neg, s_neg). For evaluation, which can be included in the classification layer 440, the output 450 can include the bounded box labeled as the class with the maximum confidence.

Figure 5:
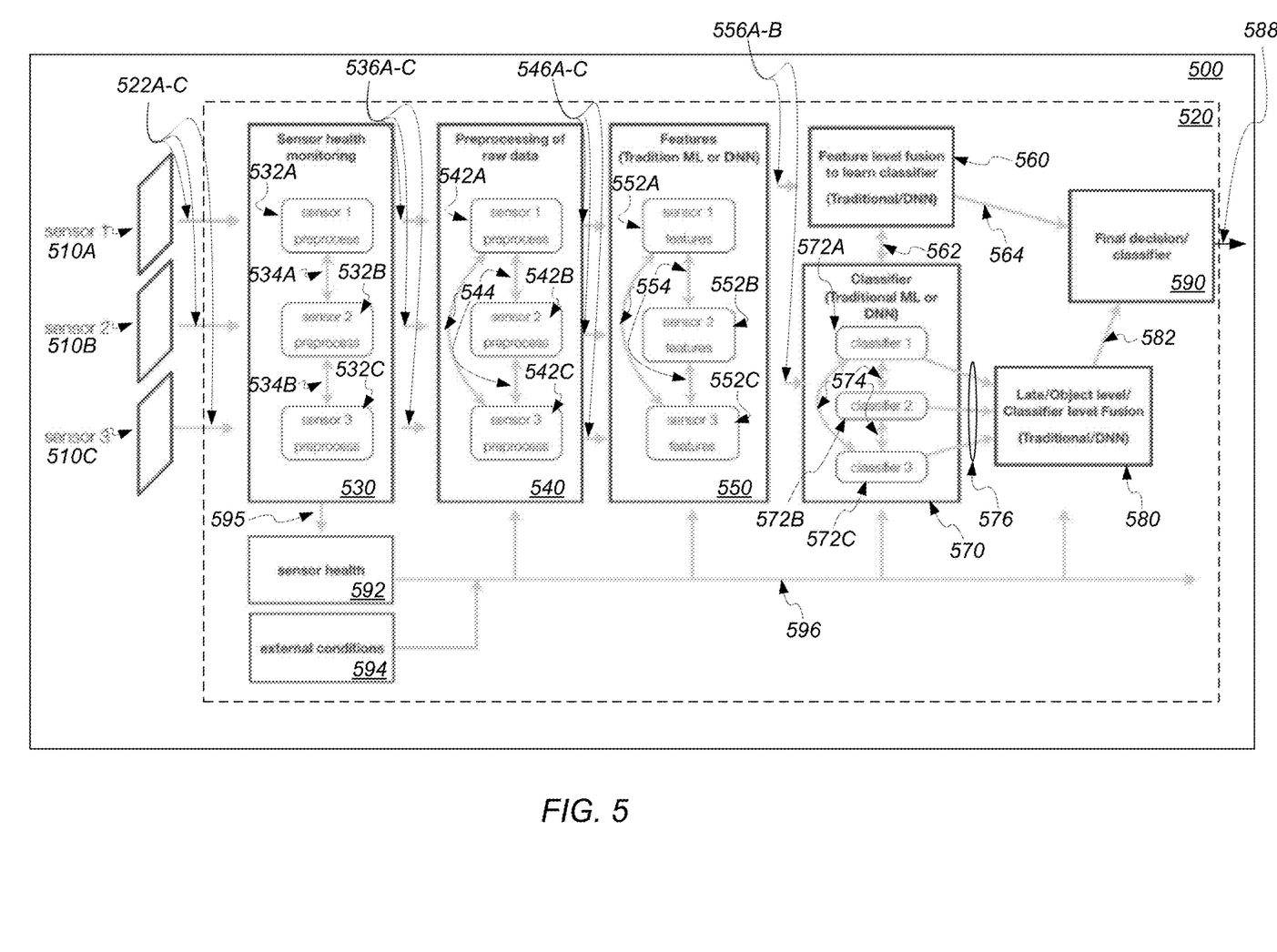
FIG. 5 illustrates a vehicle, according to some embodiments.

FIG. 5 illustrates a vehicle, according to some embodiments. The vehicle 500 can include any of the embodiments of sensor data-processing systems included herein. The vehicle 500 can include any of the embodiments of vehicles included herein, including the vehicle 110 illustrated in FIG. 1.

Some embodiments, includes a sensor data-processing system which can adjust sensor data processing, of representations generated by one or more sensor devices, based on external factors including indications of sensor health, environmental conditions, some combination thereof, etc.

For example, where a vehicle includes multiple sensors, when one or more sensors fails or generates degraded data because of external conditions like weather, a sensor and environment monitoring algorithm included in the sensor data-processing system of the vehicle can notify various detection and classification layers included in the system.

The layers can be configured to respond to determinations that various particular sensors are at least partially degraded in various ways. In one example, the layers are configured to switch to an operation mode which only utilizes sensor data representations generated by sensors which are determined to be reliable. Such an example can include multiple separate classifier layers associated with various particular combinations and configurations of sensors, where a particular classifier layer is utilized to detect and classify features in received sensor data from a particular configuration of sensors. Such a method can require, where a vehicle includes "n" sensors, a quantity of "$2^n-1$" separate classifier layers—one classifier layer per combination of all possible configurations of sensors.

In another example, the layers include a classifier layer which is trained for each particular operation mode, also referred to herein as a sensor modality, separately, so that an individual classifier layer can operate according to various modalities. As a result, the classifier layer can utilize, in a given sensor modality, a particular configuration of sensors and can further utilize additional sensor data input outside of the configuration to augment outputs. Operation of such a layer can include the sensor data-processing system responding to a sensor failing or working un-reliably by notifying the classifier, which can result in a confidence in that sensor's output being downgraded at the classifier layer.

In some embodiments, a sensor data-processing system which includes one or more layers which detect and classify features based on sensor data representations generated by multiple sensor devices is configured to fuse sensor data representations generated by multiple sensor devices into a fused sensor data representation and is further configured to detect and classify features in the fused sensor data representation. Such a fusion and classification process can be referred to as "early fusion" which is distinguished from fusion of features which are detected and classified in separate sensor data representations generated by separate sensors, which is referred to as "late fusion". Early fusion can augment sensor data processing, as features can be detected and classified more accurately as a result of detecting and classifying features based on an individual sensor data representation which is a fusion of multiple sensor data representations from separate sensors.

Vehicle 500 includes a set of sensor devices 510A-C configured to generate sensor data representations 522A-C of one or more portions of an external environment. Vehicle 500 includes a sensor data-processing system 520 which processes the representations 522A-C and generates, as an output 588, a set of bounding boxes which represent regions of the environment in which various environment objects are located, where each bounding box is associated with a class label which indicates an object class of the environment object located in the portion of the environment encompassed by the bounding box.

System 520 includes a sensor health monitoring layer 530 which implements preprocessing 532A-C of sensor data representations 522A-C to determine a performance state of the sensors 510A-C and generates sensor health data associated with the various sensors 510 which is communicated 595 to a sensor health layer 592. A health state associated with a sensor device 510 can indicate a level to which the sensor data representations 522 generated by the sensor device 510 are degraded from an optimum level. A health state can indicate that a sensor device is generating degraded data and is therefore not reliable. The performance state information can be communicated 596 by layer 592 to various processing, detection, fusion, and classifier layers which can adjust operating modes accordingly so that the layers can adjust confidence levels associated with various sensor data representations generated by the sensors. In some embodiments, layer 530 is configured to fuse 534A-B sensor data representations 522A-C into one or more fused sensor data representations. As referred to herein, fusing separate sensor data representations into a fused sensor data representation can be based at least in part upon confidence values associated with separate sensor data representations generated by separate sensor devices, where a respective contribution, also referred to as weighting, of sensor data representations generated by separate sensor devices to the fused sensor data representation, is based at least in part upon the confidence values associated with the sensor data representations. For example, where a confidence value associated with representations generated by sensor 510A is lower than a confidence value associated with representations generated by sensor 510B, the representations generated by sensor 510B can have a greater contribution, weight, etc. upon the fused representation generated as a result of fusing the representations generated by at least sensors 510A-B than the representations generated by sensor 510A. As a result, where confidence values are associated with a determined performance, reliability, etc. of sensor data generated by a sensor, the data can be given greater or lesser weight in generating a fused sensor data representation based on the relative performance, reliability, etc. indicated by the confidence values associated with the data.

System 520 includes an external condition monitoring layer 594 which processes external condition data, indicating one or more external environment conditions of the external environment, received from one or more external sensor devices included in the vehicle 500. Based on the processing, the layer 594 can determine that one or more sensor devices 510 are degraded based on the external environmental condition. For example, where layer 594 determines, based on processing precipitation data from an environmental precipitation sensor in the vehicle 500, that rain is present in the environment, layer 594 can determine that a sensor 510 which includes a LIDAR device is at least partially degraded, such that LIDAR data including point clouds associated with extended distance from the vehicle 500 is not reliable and LIDAR data including point clouds associated with close proximity to the vehicle 500 remains reliable. Layer 594 can, based on the determinations, generate performance state data which is communicated 596 to the various layers which adjust operating modes based on the performance state data.

System 520 includes a preprocessing layer 540 which implements pre-processing 542A-C of sensor data representations 536A-C, generated by the sensors 510A-C and received from layer 530. In some embodiments, the representations 536A-C include additional data generated by layer 530, including confidence levels associated with the separate representations 522A-C based on the pre-processing 532A-C of the representations 522A-C.

In some embodiments, preprocessing data comprises computing one or more features in a sensor data representation, based on features detected in the representations. For example, where a sensor data representation 522 of reflection point clouds generated by a LIDAR sensor 510 includes x,y,z coordinate and intensity data for each reflection point included in the representation, implementing a preprocessing of the representation can include computing, for one or more reflection points, one or more features including height from a ground level, distance from the vehicle, etc. Such features can be more useful for feature classification.

In some embodiments, layer 540 is configured to fuse 544 one or more representations 536A-C into one or more fused sensor data representations. Such fusion, referred to herein as "early fusion", can include computing one or more sensor data features based on preprocessing a fused sensor data representation.

System 520 can include a feature detection layer 550 which receives preprocessed sensor data representations 546A-C from layer 540 and detects one or more features in the received representations. Such detected features can include features included in the original representations 522A-C and passed through to the representations 546A-C, features computed at layer 540, some combination thereof, etc. Feature detection can include, for one or more features, determining a bounding box which indicates a particular region of a sensor data representation of an environment in which a detected feature is located. In some embodiments, layer 550 is configured to implement one or more of traditional machine learning algorithms, deep learning algorithms, etc. to detect one or more features included in one or more received sensor data representations 546A-C. In some embodiments, layer 550 is configured to fuse 554 one or more representations 546A-C into one or more fused sensor data representations. Such fusion, referred to herein as "early fusion", can include computing one or more sensor data features based on preprocessing a fused sensor data representation. Outputs 556A-B from layer 550 can include sensor data representations 546, a state of detected features in the representations, a set of bounding boxes associated with the features, etc.

System 520 includes a feature level fusion to learn classifier layer 560 which is configured to learn one or more feature class labels via which one or more environmental objects can be classified. Layer 560 can utilize one or more traditional machine learning algorithms, deep learning algorithms, etc. Layer 560 can generate outputs 562, 564 which associates various features with various class labels.

System 520 includes a layer 570 which implements one or more various classifier sublayers 572A-C which classify one or more various detected features provided in outputs 556A-B from layer 550. In some embodiments, each classifier sublayer 572A-C associates one or more detected features with one or more particular sets of class labels and determines a confidence level associated with each association. In some embodiments, layer 570 discards one or more features, detected at layer 560, which is associated with a confidence level which is below a certain threshold level.

In some embodiments, each set of classifier sublayers 572A-C is configured to classify features detected in separate sensor data representations and are configured to communicate 574 with each other, so that classifications implemented in one or more sublayers 572 are based on classifications implemented in another one or more sublayers 572.

In some embodiments, system 520 includes a classifier level fusion layer 580 that is configured to fuse 576 features classified from separate sensor data representations into a common set of features. Such fusion, referred to herein as "late fusion", can include determining confidence levels for various classified features based on the detection and classification of such features in multiple sensor data representations by multiple sublayers 572A-C.

System 520 includes a final decision classifier layer 590 which is configured to receive feature classifier output 564 and fused classified features 582 and generate an output 588 which includes a list of features located in the environment along with bounding boxes, class labels, and confidence levels associated with each feature. The output 588 can be incorporated into a world model of the environment, such that an autonomous navigation system included in the vehicle 500 can track the various objects associated with the detected and classified features in the environment and can navigate the vehicle 500 accordingly.

Figure 6:
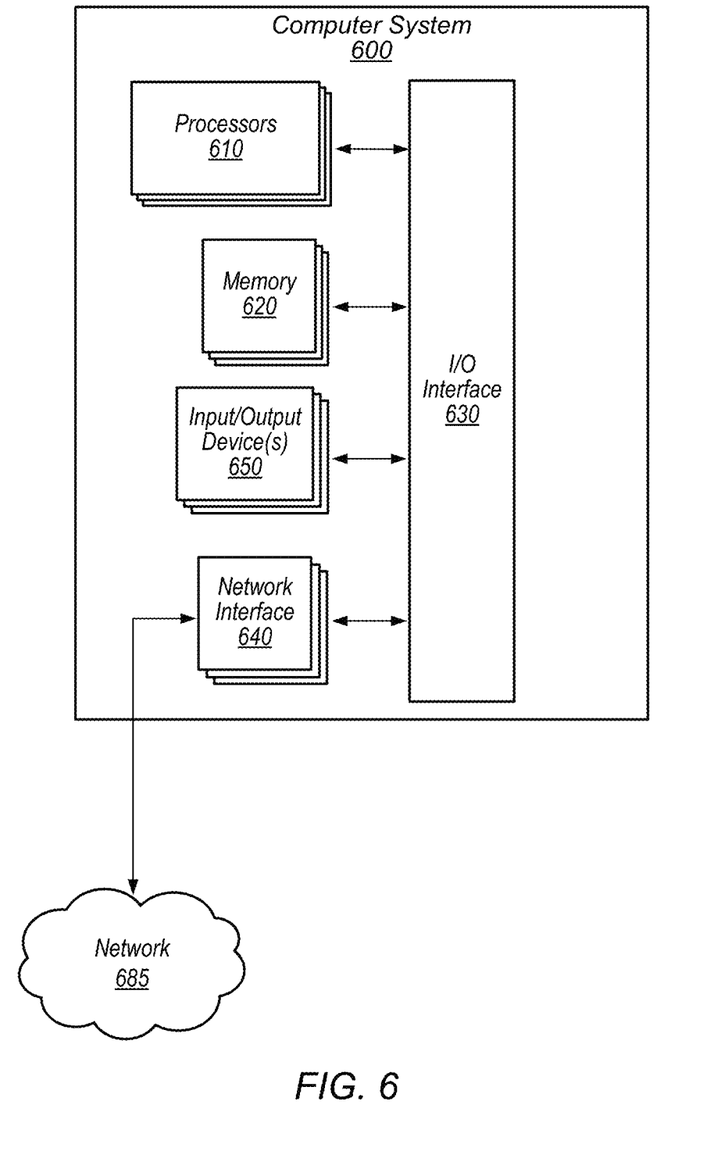
FIG. 6 illustrates a computer system that may be configured to include or execute any or all of the embodiments described herein.

FIG. 6 illustrates an example computer system 600 that may be configured to include or execute any or all of the embodiments described above. In different embodiments, computer system 600 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or a video camera, a set top box, a mobile device, a consumer device, video game console, handheld video game device, application server, storage device, a television, a video recording device, a peripheral device such as a switch, modem, router, or in general any type of computing or electronic device.

Various embodiments of sensor data processors as described herein may be executed in one or more computer systems 600, which may interact with various other devices. Note that any component, action, or functionality described above with respect to FIGS. 1 through 5 may be implemented on one or more computers configured as computer system 600 of FIG. 6, according to various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions and/or control data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. Program instructions may be configured to implement control application incorporating any of the functionality described above. Additionally, program instructions of memory 620 may include any of the information or data structures described above. In some embodiments, program instructions and/or data may be received, sent or stored upon different types of computer-accessible media or on similar media separate from system memory 620 or computer system 600. While computer system 600 is described as implementing the functionality of functional blocks of previous Figures, any of the functionality described herein may be implemented via such a computer system.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network 685 (e.g., carrier or agent devices) or between nodes of computer system 600. Network 685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Memory 620 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
a sensor data-processing system comprising one or more processors and memory configured to:
preprocess a plurality of sensor data representations of an environment, generated by a plurality of separate sensor devices, to combine the plurality of sensor data representations into a fused sensor data representation of the environment;
after combining the sensor data representations, detect a feature associated with at least one object in the fused sensor data representation of the environment;
identify one or more object classifications for the feature as detected in the fused sensor data representation;
detect the feature associated with the at least one object in respective ones of the plurality of sensor data representations of the environment;
determine corresponding one or more classification confidence values for the one or more object classifications based on the feature as detected in the respective ones of the plurality of sensor data representations; and
classify the at least one object according to the one or more object classifications and the one or more classification confidence values.

2. The apparatus of claim 1, wherein the sensor data-processing system is configured to:
based on detecting the feature associated with the object, identify a particular region of a sensor data representation of the environment in which the detected feature is located.

3. The apparatus of claim 1, wherein the plurality of separate sensor devices comprise two or more of a visible light sensor, a near infrared sensor, a LIDAR sensor, a stereo sensor, a radar device, or an IMU sensor.

4. The apparatus of claim 1, wherein the sensor data-processing system is configured to:
detect the feature associated with the object based on processing the fused sensor data representation via at least one of:
at least one traditional machine learning algorithm; or
at least one deep learning algorithm.

5. The apparatus of claim 1, wherein:
fusing the plurality of sensor data representations comprises weighting a contribution of separate sensor data representations generated by separate sensor devices to the fused sensor data representation based on separate confidence values associated with the separate sensor data representations; and
the sensor data-processing system is configured to adjust at least one confidence level associated with sensor data representations generated by at least one sensor device, based on a determination that sensor data representations generated by the at least one sensor device are at least partially degraded.

6. The apparatus of claim 5, wherein the sensor data-processing system is configured to:
determine that sensor data representations generated by the at least one sensor device are at least partially degraded based on external condition data which indicates an external environment condition of the environment.

7. The apparatus of claim 5, wherein the sensor data-processing system is configured to:
determine that sensor data representations generated by the at least one sensor device are at least partially degraded based on performance state information, indicating a health state of the at least one sensor device.

8. A method, comprising:
performing, by one or more computer systems:
preprocessing a plurality of sensor data representations of an environment, generated by a plurality of separate sensor devices, to combine the plurality of sensor data representations into a fused sensor data representation of the environment;

after combining the sensor data representations, detecting a feature, associated with at least one object, in the fused sensor data representation of the environment;

identifying one or more object classifications for the feature as detected in the fused sensor data representation;

detect the feature associated with the at least one object in respective ones of the plurality of sensor data representations of the environment;

determine corresponding one or more classification confidence values for the one or more object classifications based on the feature as detected in the respective ones of the plurality of sensor data representations; and classifying the at least one object according to the one or more object classifications and the one or more confidence values.

9. The method of claim 8, comprising:
based on detecting the feature associated with the object, identifying a particular region of a sensor data representation of the environment in which the detected feature is located.

10. The method of claim 8, comprising:
discarding the detected feature based at least in part upon a determination that the one or more confidence values do not satisfy a threshold level.

11. The method of claim 8, comprising:
detecting the feature associated with the object based on processing the fused sensor data representation via at least one of:
at least one traditional machine learning algorithm; or
at least one deep learning algorithm.

12. The method of claim 8, wherein:
fusing the plurality of sensor data representations comprises weighting a contribution of separate sensor data representations generated by separate sensor devices to the fused sensor data representation based on separate confidence values associated with the separate sensor data representations; and
the method comprises adjusting at least one confidence level associated with sensor data representations generated by at least one sensor device, based on a determination that sensor data representations generated by the at least one sensor device are at least partially degraded.

13. The method of claim 12, comprising:
determining that sensor data representations generated by the at least one sensor device are at least partially degraded based on external condition data which indicates an external environment condition of the environment.

14. The method of claim 12, comprising:
determining that sensor data representations generated by the at least one sensor device are at least partially degraded based on performance state information, indicating a health state of the at least one sensor device.

15. A non-transitory, computer-readable medium storing a program of instructions which, when executed by at least one computer system, causes the at least one computer system to:
preprocess a plurality of sensor data representations of an environment, generated by a plurality of separate sensor devices, to combine the plurality of sensor data representations into a fused sensor data representation of the environment; and after combining the sensor data representations, detect a feature, associated with at least one object, in the fused sensor data representation of the environment;

identify one or more object classifications for the feature as detected in the fused sensor data representation;

detect the feature associated with the at least one object in respective ones of the plurality of sensor data representations of the environment;

determine corresponding one or more classification confidence values for the one or more object classifications based on the feature as detected in the respective ones of the plurality of sensor data representations; and classify the at least one object according to the one or more object classifications and the one or more classification confidence values.

16. The non-transitory, computer-readable medium of claim 15, wherein the program of instructions, when executed by the at least one computer system, cause the at least one computer system to:
based on detecting the feature associated with the object, identify a particular region of a sensor data representation of the environment in which the detected feature is located.

17. The non-transitory, computer-readable medium of claim 16, wherein the program of instructions, when executed by the at least one computer system, cause the at least one computer system to:
generate a list of bounding boxes indicating regions of the sensor data representation of the environment having detected features and corresponding object classifications for the detected features, wherein the list of bounding boxes includes a bounding box for the particular region and the at least one object.

18. The non-transitory, computer-readable medium of claim 15, wherein:
fusing the plurality of sensor data representations comprises weighting a contribution of separate sensor data representations generated by separate sensor devices to the fused sensor data representation based on separate confidence values associated with the separate sensor data representations; and
the program of instructions, when executed by the at least one computer system, cause the at least one computer system to:
adjust at least one confidence level associated with sensor data representations generated by at least one sensor device, based on a determination that sensor data representations generated by the at least one sensor device are at least partially degraded.

19. The non-transitory, computer-readable medium of claim 18, wherein the program of instructions, when executed by the at least one computer system, cause the at least one computer system to:
determine that sensor data representations generated by at least one sensor device are at least partially degraded based on external condition data which indicates an external environment condition of the environment.

20. The non-transitory, computer-readable medium of claim 18, wherein the program of instructions, when executed by the at least one computer system, cause the at least one computer system to:
determine that sensor data representations generated by the at least one sensor device are at least partially degraded based on performance state information, indicating a health state of the at least one sensor device.

* * * * *